United States Patent [19]

Schlosser et al.

[11] 4,092,018
[45] May 30, 1978

[54] FIXTURE FOR USE IN FABRICATING RINGS FROM SEPARATE SEGMENTS

[75] Inventors: Werner Schlosser, Munich; Horst Berger, Lochham, both of Germany

[73] Assignee: Motoren- und Turbinen Union Munchen GmbH, Munich, Germany

[21] Appl. No.: 781,909

[22] Filed: Mar. 28, 1977

Related U.S. Application Data

[62] Division of Ser. No. 533,587, Dec. 17, 1974, Pat. No. 4,034,182.

[30] Foreign Application Priority Data

Dec. 21, 1973 Germany .............................. 2363722

[51] Int. Cl.² ............................................. B25B 1/08
[52] U.S. Cl. .................................... 269/234; 269/287
[58] Field of Search ................... 29/156.8 R; 279/121; 228/44.1; 269/287, 234, 321 W

[56] References Cited

U.S. PATENT DOCUMENTS

| 855,134 | 5/1907 | Risbridger | 269/287 |
| 1,958,705 | 5/1934 | Klein | 269/234 |

Primary Examiner—Robert C. Watson
Attorney, Agent, or Firm—Alan H. Levine

[57] ABSTRACT

Separate segments, oversized to allow for shrinkage during welding, are assembled in the shape of a ring. The segments may be plates carrying guide vanes. The assembled ring is placed in a vacuum chamber and the joints between segments welded by an electron beam. The welding may be carried out in two steps, namely, first track welding the segments together followed by finish welding the entire length of each joint. The segments may be held during welding in a fixture comprising a circular array of radially-slidable jaw elements which carry the separate segments. A clamping ring urges the jaw elements, and hence the segments, radially inwardly, and a cover plate engages the separate segments and urges them radially inwardly so as to clamp the segments together in a ring shape.

6 Claims, 12 Drawing Figures

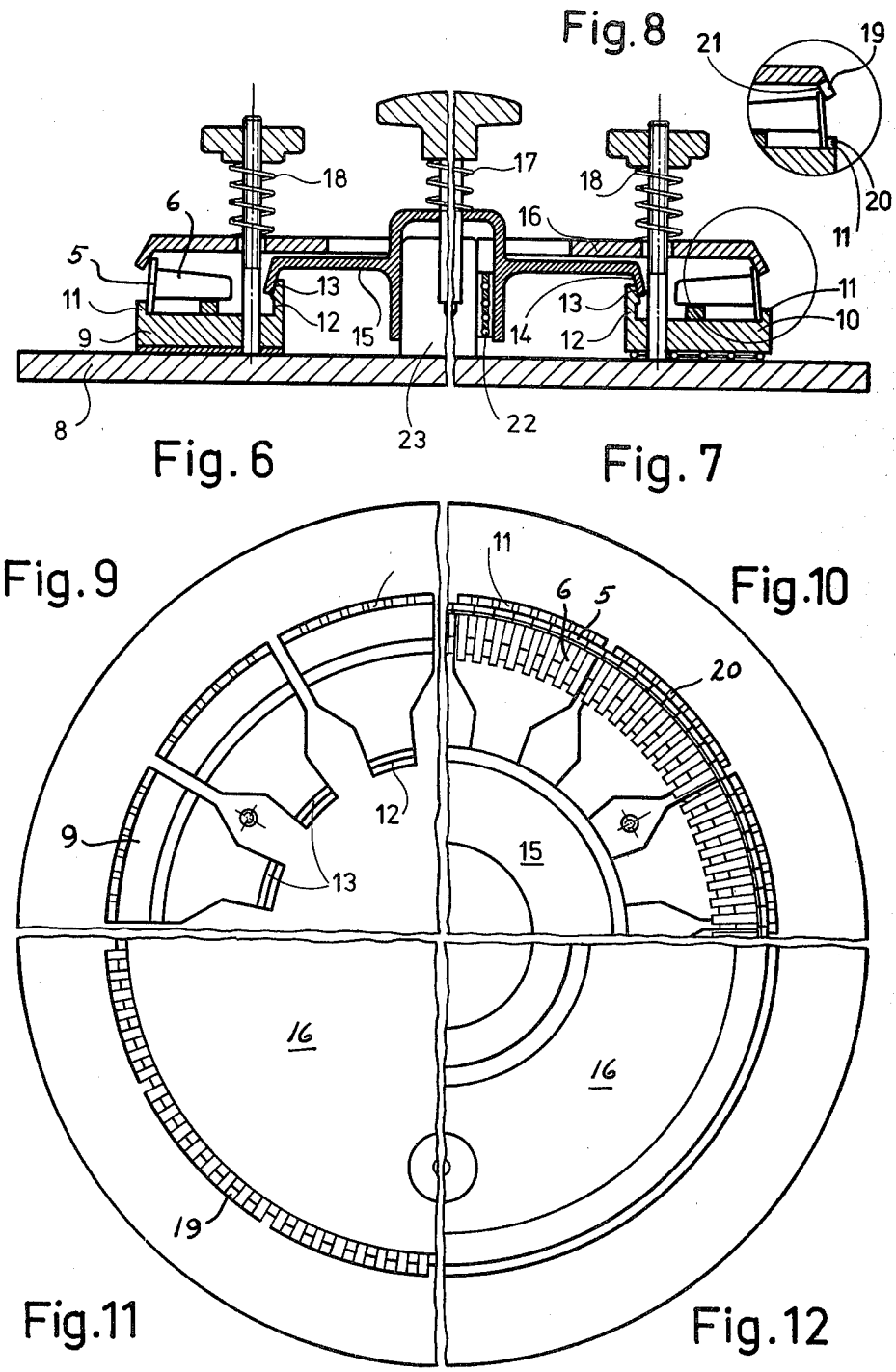

FIXTURE FOR USE IN FABRICATING RINGS FROM SEPARATE SEGMENTS

This application is a division of application Ser. No. 533,587, filed Dec. 17, 1974, now U.S. Pat. No. 4,034,182.

This invention relates to methods and apparatus for fabricating closely-toleranced rings, and more particularly the invention relates to methods and apparatus for fabricating rows of guide vanes, by welding together a plurality of suitably fashioned separate segments with the aid of electron beam welding.

Heretofore a method has been known for fabricating closely-toleranced rings from separate segments by collecting the segments into a number of groups and joining the members of each group together by electron beam welding in an evacuated chamber. After welding, the groups are then gauged, reworked, again collected into larger groups, placed in the vacuum chamber and welded together. This procedure is repeated until the ring is complete. This method has enabled, e.g., rows of compressor guide vanes to be fabricated from more than 100 plate segments, each carrying a guide vane. The disadvantage inherent in this method has been that fabrication of such a stator ring necessitates the repeated use and evacuation of the vacuum chamber and the attendant great expense of the entire method.

Another consideration is that when the repetitive steps of this procedure are limited to an economically acceptable number, this is often achieved only at the expense of the intended accuracy in manufacture, causing waste and with it, poor economy.

A broad object of this invention is to provide a method which gives greater economy than does the method known heretofore and which, more particularly, avoids the great expense of repeated loading in the vacuum chamber and repeated evacuation while still ensuring the requisite degree of accuracy in manufacture and great consistency of results without intolerable rejection rates. It is a particular object of the present invention to provide a method by which all the plate segments for a ring are manufactured with an allowance for shrinkage in welding, are disposed in annular arrangment, are clamped one against the other, and are joined one to the other by welding when loaded in the vacuum chamber.

This method makes it possible to escape the disadvantages in the state of the art known heretofore and, more particularly, it avoids the costly repetitive loading of grouped segments in the welding chamber, and it gives greater accuracy in shape and more reliably achieved dimensions within the intended close tolerances than will the method known heretofore.

It is a further object of this invention to provide such a method involving welding in two steps, namely, tack welding followed by finish welding. This prevents inadvertent changes in relative position during finish welding which might impair the manufacturing accuracy.

According to a further feature of this invention the welding beam is guided over the weld joint by electronic means, which makes for faster welding rates. Also, once the initial settings have been made, this method is easy to follow, and it can be repeated at a fast rate.

According to a further feature of the present invention the change-over of the electron beam from one joint to the next is achieved by rotating the welding fixture, which because of the structure of the fixture needed for other reasons, is a simpler expedient than deflecting the electron beam.

According to a further feature of the present invention the sequence of welding the various joints, when tack welding is selected is such that when one tack weld has been completed the fixture is rotated through an angle which places the adjacent joint under the beam. This makes tack welding particularly economical.

According to a further feature of this invention the sequence of welding the various joints, when finish welding is selected is such that when one finish weld has been completed, the fixture is rotated through 180° for welding a diametrically opposite joint next. This spreads the shrinkage more uniformly over the ring and improves the manufacturing accuracy.

To implement the method, use is made of a fixture for holding the plate segments, the fixture having a plurality of jaw segments which are arranged in a circle on a base plate for radial sliding movement in a single plane. The jaw segments have at their radially outer ends, a locating rim sized in accordance with the diameter of the ring, and have at their inner ends, a vertical leg serving to uniformly draw the jaw segments inwards with the aid of a suitable clamping ring having a tapered inner face. The fixture is further provided with a cover plate having a tapered inner face at its outer edge and a central hole for sliding movement over a guide rod, the locating rims of the jaw segments and the tapered inner face of the cover plate uniformly urging the separate ring segments radially inwards, constraining them to take the form of a ring and clamping them one against the other.

This fixture serves to rapidly arrange and retain in their relative position all ring segments needed to form a ring, and it permits the ring segments to be safely clamped one against the other in front and to be advanced during welding as necessary to make up for shrinkage. It further ensures faithful preservation of the annular form before and during welding.

According to a further feature of this invention the fixture is provided with slots cut into the rim of the cover and into each locating rim, the slots being disposed such that the electron beam can readily cover the entire length of a joint, so that the joints between the ring segments can be welded over their full length.

According to a further feature of the present invention, surface ball bearings are arranged between the jaw segments to minimize friction between the jaw segments and the base plate and to assist the radial follow-up movements of the jaw segments.

According to a still further feature of the present invention the fixture is provided with an annular surface ball bearing arranged between the central guide hole in the cover and the guide rod to assist the follow-up movements of the cover and thus improve manufacturing accuracy.

The accompanying drawings illustrate rings and a fixture produced and used, respectively, by means of the method of this invention, in which:

FIG. 6 is a cross-sectional view illustrating the left-hand half of a fixture for manufacturing a ring by means of the method of this invention using plain bearings;

FIG. 7 is a cross-sectional view illustrating the right-hand half of the fixture shown in FIG. 6, but with roller bearings;

FIG. 8 is a detail view of a portion of FIG. 7 illustrating the retaining means for vanes, this retaining means having slots;

FIG. 9 is a top view illustrating a sector of a base plate having plate segments (slotted design);

FIG. 10 is a top view illustrating a sector as shown in FIG. 9, having vanes and a clamping ring in position;

FIG. 11 is a top view illustrating a sector as shown in FIG. 9, having a cover plate in position and with slots;

FIG. 12 is a top view illustrating a sector as shown in FIG. 11, but without slots.

Figure 2:
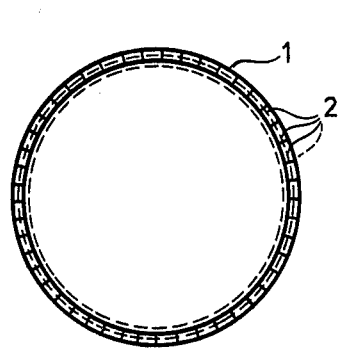
FIG. 2 is a plan view of a ring composed of plate segments, before and after welding (the latter being shown in broken lines)
Figure 3:
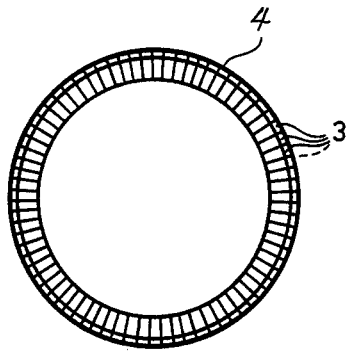
FIG. 3 is a plan view of a row of guide vanes fabricated in accordance with the method of this invention.
Figure 1:
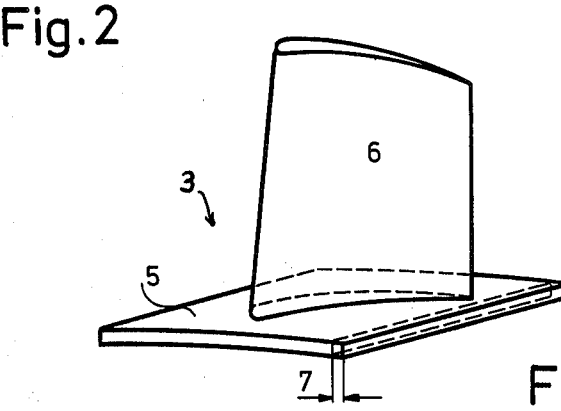
FIG. 1 is a perspective view of a plate segment and vane.
Figure 4:
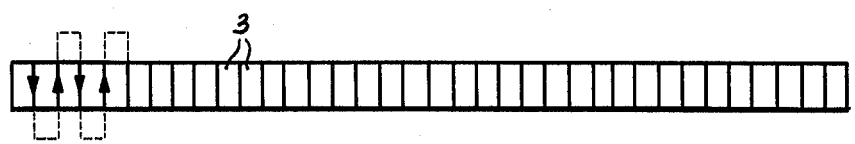
Figure 5:
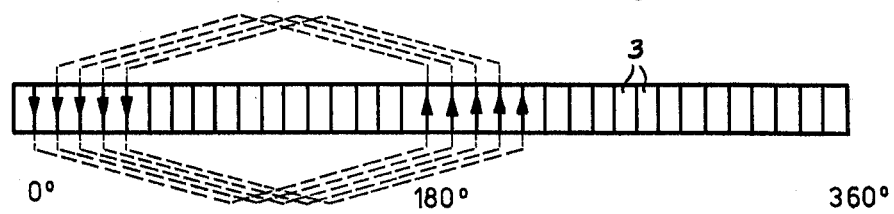

rims 11 within which all ring segments 5 of a ring are arranged circumferentially one next to the other. At their radially inner ends the jaw segments have upstanding legs 12 presenting angled slide faces 13 which are uniformly urged radially inwards by cooperating with the tapered inner face 14 of a clamping ring 15. This arrangement serves to clamp all the ring segments 5 at their ends nearer the base plate to form a ring. This function is served also by a cover plate 16, the same inner face 21 (FIG. 8) of which also tightens the tapered ring at its upper end, and thus completely. Tension comes from the force of the clamping ring and the cover plate bearing down on the base plate as a result of their weight and, chiefly, from springs 17, 18 which are preloaded by nuts. This makes the proper functioning of the fixture independent of its position.

With this fixture, however, the

5. A fixture as defined in claim 3 wherein said jaw elements are rotatable about said guide rod with respect to said base plate, and including ball bearings between said jaw elements and said base plate.

6. A fixture as defined in claim 3 wherein said jaw elements and clamping ring are rotatable about said guide rod with respect to said base plate, and including ball bearings between said guide rod and said hole in said clamping ring.

* * * * *